(12) United States Patent
Bailey et al.

(10) Patent No.: US 8,832,412 B2
(45) Date of Patent: Sep. 9, 2014

(54) SCALABLE PROCESSING UNIT

(75) Inventors: Neil Bailey, Cambridge (GB); Eben Upton, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 283 days.

(21) Appl. No.: 13/236,822

(22) Filed: Sep. 20, 2011

(65) Prior Publication Data

US 2013/0024652 A1 Jan. 24, 2013

Related U.S. Application Data

(60) Provisional application No. 61/509,797, filed on Jul. 20, 2011.

(51) Int. Cl.
*G06F 15/16* (2006.01)
*G06F 13/14* (2006.01)
*H04N 7/26* (2006.01)
*G06F 13/364* (2006.01)

(52) U.S. Cl.
CPC .......... *H04N 19/00527* (2013.01); *G06F 15/16* (2013.01); *G06F 13/364* (2013.01); *H04N 19/00321* (2013.01); *H04N 19/00103* (2013.01); *H04N 19/00206* (2013.01)
USPC ............................................................ 712/3

(58) Field of Classification Search
CPC ......... G06F 9/06; G06F 15/16; G06F 9/3814; G06F 9/3836; G06F 13/364; G06F 9/3885; H04N 19/00206; H04N 19/00103; H04N 19/00321; H04N 19/00527

USPC .............................................................. 712/3
See application file for complete search history.

(56) References Cited

U.S. PATENT DOCUMENTS

| 6,976,182 | B1 * | 12/2005 | Filippo | 713/324 |
| 7,036,032 | B2 * | 4/2006 | Mizuyabu et al. | 713/323 |
| 8,424,012 | B1 * | 4/2013 | Karandikar et al. | 718/108 |
| 2003/0159023 | A1 * | 8/2003 | Barlow et al. | 712/241 |
| 2009/0049279 | A1 * | 2/2009 | Steiss et al. | 712/215 |

* cited by examiner

*Primary Examiner* — Eric Coleman
(74) *Attorney, Agent, or Firm* — McDermott Will & Emery LLP

(57) ABSTRACT

Various methods and systems are provided for processing units that may be scaled. In one embodiment, a processing unit includes a plurality of scalar processing units and a vector processing unit in communication with each of the plurality of scalar processing units. The vector processing unit is configured to coordinate execution of instructions received from the plurality of scalar processing units. In another embodiment, a scalar instruction packet including a pre-fix instruction and a vector instruction packet including a vector instruction is obtained. Execution of the vector instruction may be modified by the pre-fix instruction in a processing unit including a vector processing unit. In another embodiment, a scalar instruction packet including a plurality of partitions is obtained. The location of the partitions is determined based upon a partition indicator included in the scalar instruction packet and a scalar instruction included in a partition is executed by a processing unit.

21 Claims, 6 Drawing Sheets

(a)

(b)

SCALABLE PROCESSING UNIT

CROSS REFERENCE TO RELATED APPLICATIONS

This application claims priority to U.S. provisional application entitled "MULTIMEDIA PROCESSING" having Ser. No. 61/509,797, filed Jul. 20, 2011, the entirety of which is hereby incorporated by reference.

BACKGROUND

Processing requirements are advancing as the world turns toward multimedia. The availability of internet multimedia content continues to improve with some sites supporting full high definition video sharing. The added use of video conferencing has also the increased the demand for better quality and faster processing. In addition, cell phones are increasingly used as digital cameras and camcorders. The move to mobile equipment is increasing the demand for high resolution image processing with low power consumption.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Image and multimedia processing may be provided through processing circuits implemented in individual chips or chip sets. For example, the multimedia processing may be implemented with a single chip having flexible and low power architecture. The processor architecture may be configured in hardware and/or software executed by processing hardware (e.g., a video processing unit).

Figure 1:
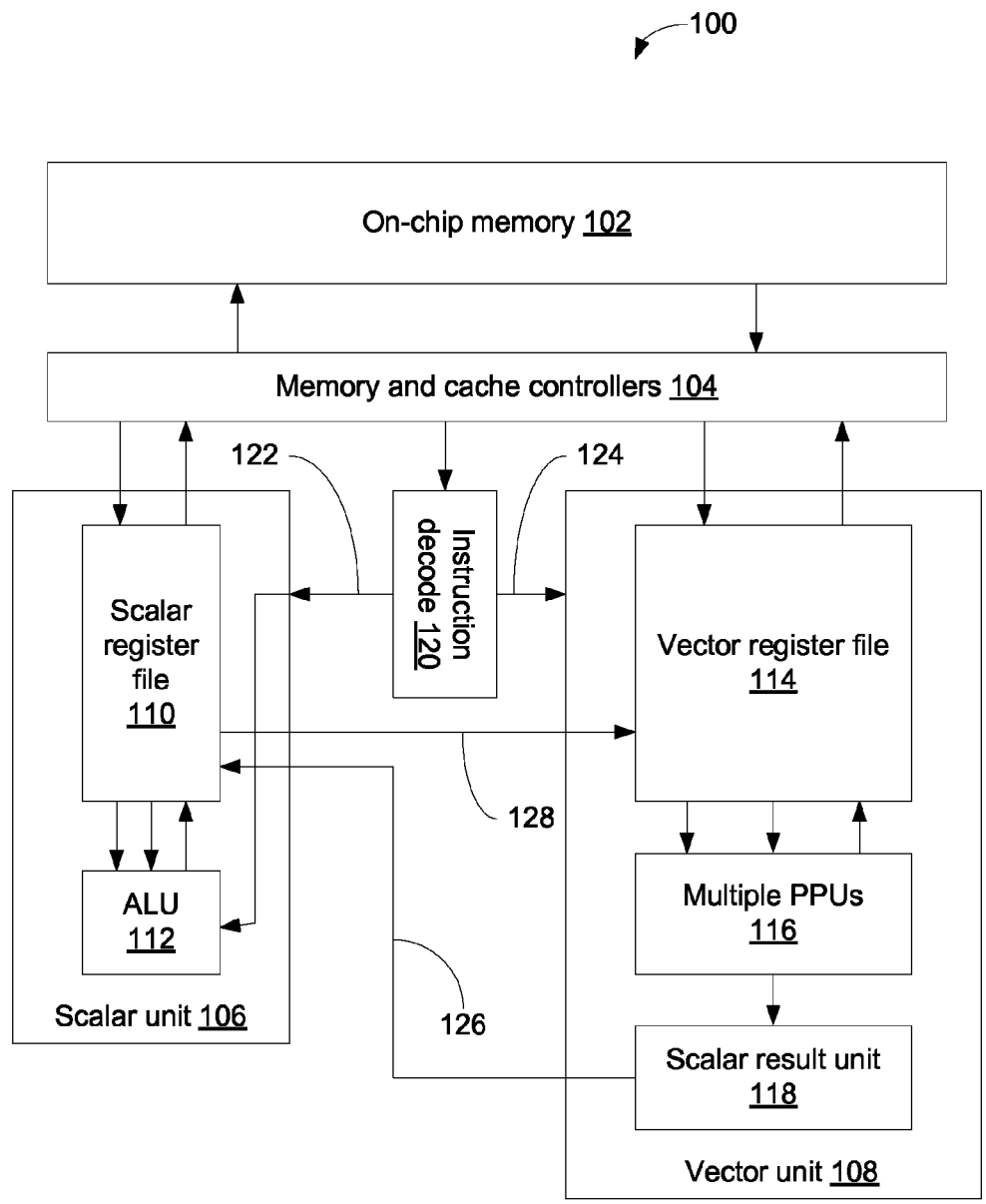
FIGS. 1-3 are graphical representations of examples of processor architectures in accordance with various embodiments of the present disclosure.

Referring to FIG. 1, shown is a graphical representation of an example of the processor architecture 100 in accordance with various embodiments of the present disclosure. An on-chip memory 102 holds instructions and data for operation of the processor. Memory and cache controllers (denoted generally by block 104) control communication of instructions and data from the on-chip memory 102 with the two main processing units of the processor architecture. The first main processing unit 106 is a scalar unit or SPU and the second main processing unit 108 is a vector unit or VPU. A scalar unit 106 is a unit capable of executing instructions defining a single operand set that is typically operating on a pair of source values and generating a destination value for each instruction. In brief, the scalar unit 106 comprises a scalar register file 110 and an arithmetic logic unit (ALU) processing block 112. A vector unit 108 operates in parallel on a plurality of value pairs to generate a plurality of results. These are often provided in the form of packed operands, that is two packed operands provide a plurality of value pairs, one from each operand in respective lanes. The vector unit 108 comprises a vector register file 114, sixteen (16) pixel processing units (PPU) (denoted generally by block 116) and scalar result unit 118. An instruction decoder 120 receives a stream of instructions from the on-chip memory 102 via the memory and cache controllers 104. The instruction stream may comprise distinct scalar and vector instructions which are sorted by the instruction decoder 120 and supplied along respective instruction paths 122 and 124 to the scalar unit 106 and to the vector unit 108 depending on the instruction encoding. The results generated by the vector unit 108, in particular in the scalar result unit 118, are available to the scalar register file 110 as denoted by arrow 126. The contents of the scalar register file 110 are available to the vector register file 114 as indicated diagrammatically by arrow 128. However, it is difficult for a scalar unit 106 to keep the corresponding vector unit 108 fed with enough data resulting in underutilization of the vector unit and an impact on the efficiency and/or performance of the processor 100.

Figure 2:
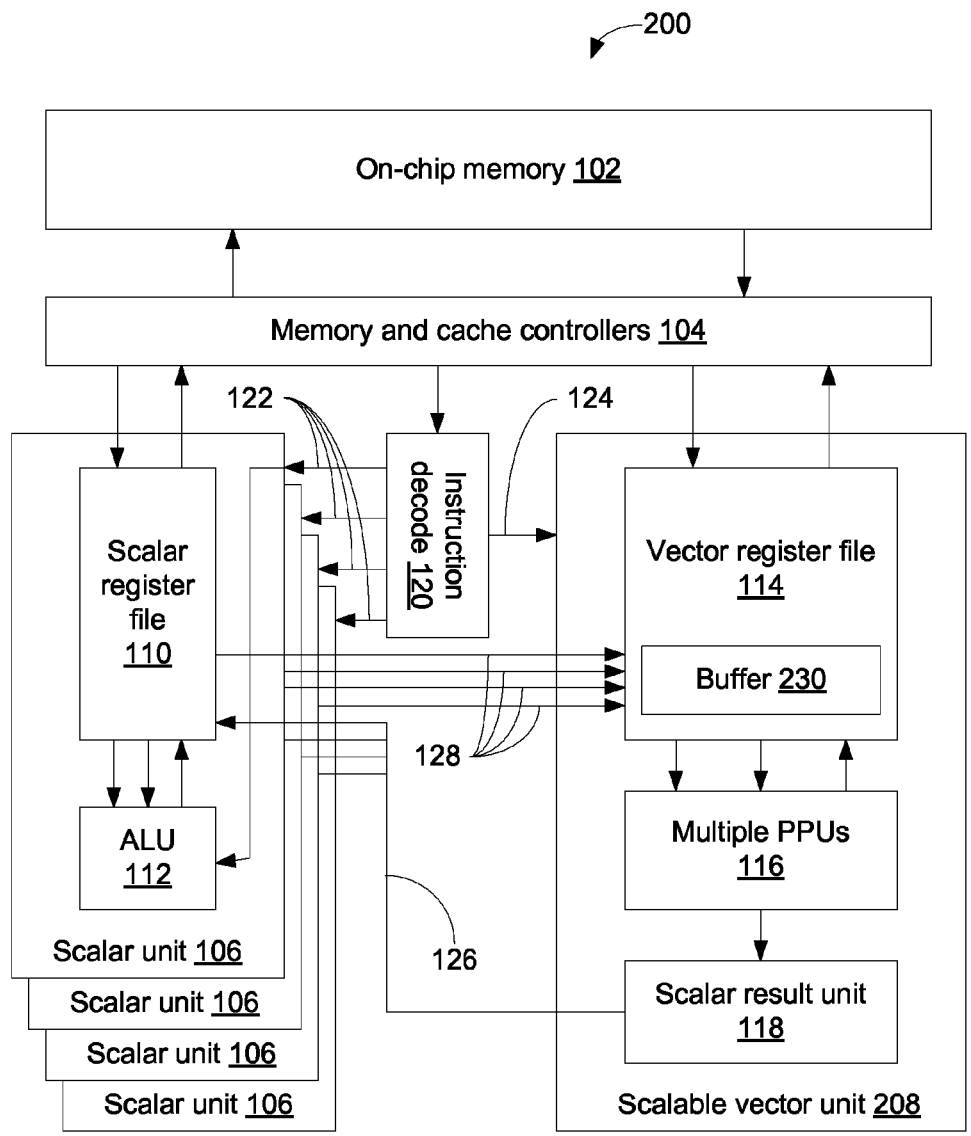

The performance of the processor 100 may be improved by utilizing a scalable video processing unit (VPU) in which a single vector unit is shared between multiple scalar units. With reference to FIG. 2, shown is a graphical representation of a processor 200 with a scalable VPU 208 including adaptable, integrated scalar and vector construction. The scalable VPU 208 supports parallel scalar processing flow with a single vector processing flow. The structure for the processing unit 200 (e.g., a video processing unit) includes a plurality of scalar units 106 (e.g., two or four scalar units 106) providing multiple paths for scalar vector processing operations with a single vector processing unit 208 that takes the parallel operated upon vectors into a single buffer 230 and operates upon the vectors. The vector processing unit 208 is configured to coordinate execution of instructions received from the plurality of scalar processing units 106. The vector unit 208 is time multiplexed between the scalar units 106 to execute the corresponding instructions on the data. At each clock cycle, instructions from the scalar units are placed in queue for execution by the scalable vector unit 208 based, e.g., upon a predetermined ranking, a predetermined ordering (e.g., a round robin), or a random ordering of the scalar units 106. For example, a predefined circular or round robin ordering may be used to determine the ordering based upon the source of the previously received instruction.

The scalable vector unit 208 has a pipeline of a number of PPUs 116 that perform operations on the data in buffer 230. In some implementations, operations for different scalar units 106 may be sequentially executed by the PPUs 116. In other cases, different PPUs 116 may be executing instructions from different scalar units 106 during the same clock cycle. In this way, instructions from the scalar units may be interleaved within the PPUs 116. Tags may be passed along the VPU 208 to indicate which scalar unit 106 corresponds to the instruction performed by that PPU 116. This scalability of the vector unit 208 can be moved downward such that smaller blocks than the vector length may be operated upon such that each block vector requires multiple passes during vector processing. The vector length may be selected to correspond to a platform and the available die space for the processing of the vectors. While the hardware that supports such vector processing is very efficient on an operational basis, it also can replace software processing that is much slower and can be less efficient from a processing and power consumption standpoint.

Figure 3:
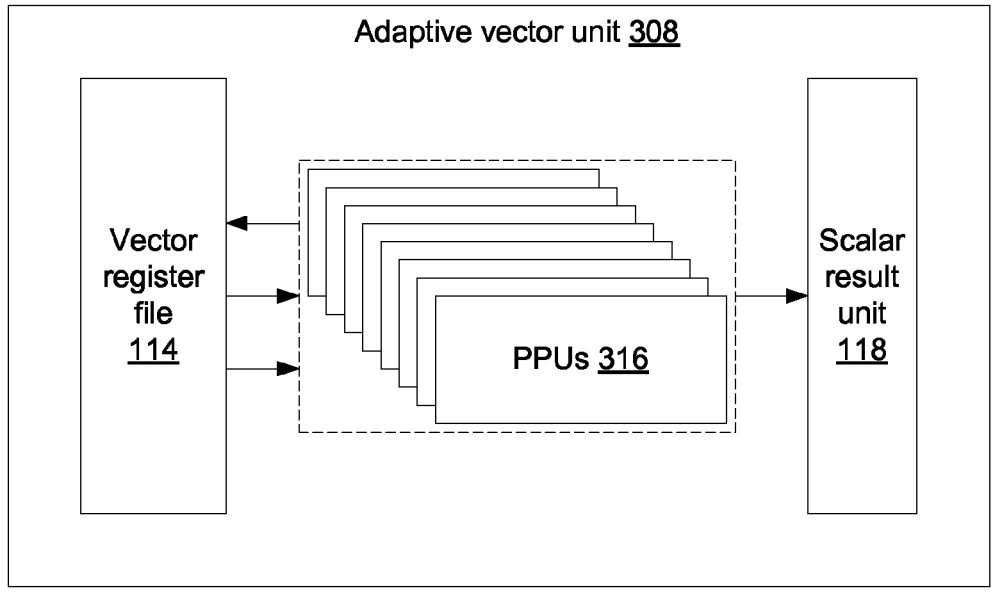
Figure 3:
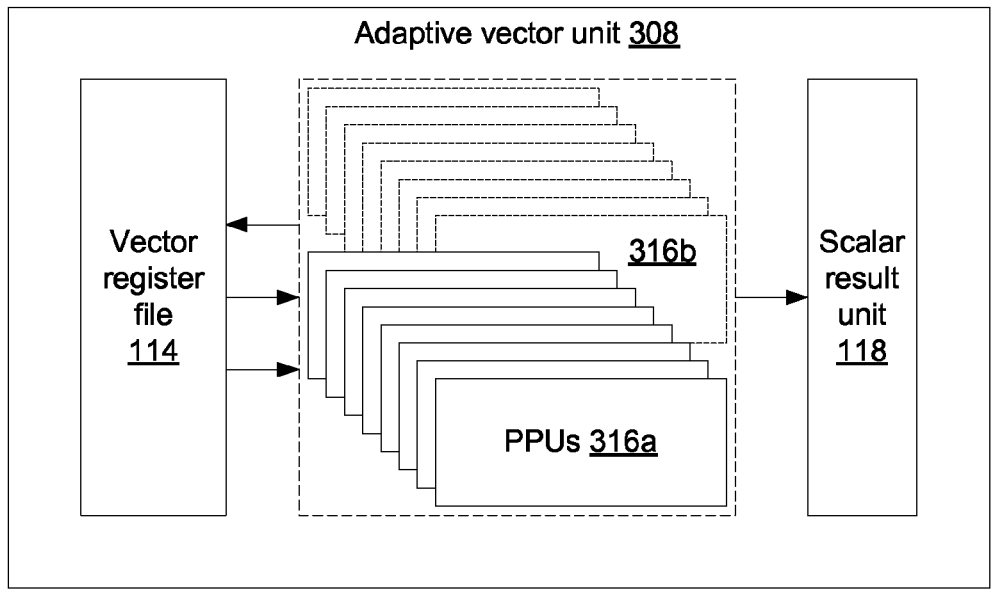

Another way to improve performance of the processor 100 utilizes a flexible and adaptive VPU architecture. With reference to FIG. 3, the vector unit 108 of FIG. 1 may be an adaptive vector processing unit (VPU) 308. The adaptive VPU architecture may be varied via a design configuration or via an adaptive reconfiguration between full sized single cycle and sub-sized multi-cycle modalities. Further, the adaptive VPU 308 performs the same functionality using the same code regardless of the designed or adapted configuration. For pixel processing, the adaptive VPU 308 contains a reduced number of pixel processing units (PPUs) 316 that can be configurable to operate as: (i) one or more single cycle PPUs, (ii) one or more PPUs each running multiple cycles, or (iii) various combinations of (i) and (ii). The unused PPUs 316 may be removed or discarded during the design phase as illustrated in FIG. 3(a) or may be placed in a power down or otherwise inactive state as illustrated in FIG. 3(b). The VPU 108 of FIG. 1 may be adapted by selecting a PPU configuration based upon any number of considerations such as battery power management, resource sharing, latency concerns, real time stream issues, etc., and combinations thereof.

As discussed above, the vector unit 108 comprises sixteen PPUs 116. In one embodiment, the number of PPUs 316 may be reduced during the design of the adaptive VPU 308. The number of PPUs 316 may be based upon a defined VPU performance to meet a desired performance level. For example, the reduced number of PPUs 316 in the adaptive VPU 308 may be configurable to be, e.g., ½ of 16(i.e., 8 as illustrated in FIG. 3(a)) or ¼ of 16(i.e., 4). This construct with a reduced number of PPUs 316 supports having a physically smaller, lower performance implementation of the processor 100, which still looks the same to a programmer. In other embodiments, a reduced number of PPUs 316a are active, while the remaining PPUs 316b are deactivated or shutdown.

If ½ or ¼ of the 16 PPUs of FIG. 1 are utilized, then each instruction is divided up by the adaptive VPU 308 and executes in 2 or 4 clock cycles, respectively, instead of a single cycle when executed by the 16 PPUs of FIG. 1. By reducing the number of PPUs 316, instructions are sequentially executed on different portions of in the vector register file 114. Reading and writing occurs at different parts of the vector register file 114 and scalar result unit 118 during each clock cycle, but the same PPUs 316 are reused to execute the instructions. However, by meeting the desired performance level, the multi-cycle behavior does not adversely impact the programmer or a user of the device. The adaptive VPU 308 provides flexibility in the design and fixed setup configurations.

In some implementations, a combination of a scalable VPU of FIG. 2 and an adaptive VPU of FIG. 3 may be utilized. For example, two scalar units 106 may be serviced by a single vector unit with a reduced number of PPUs. The vector unit is time multiplexed between the scalar units to execute the corresponding instructions. In some embodiments, the number of active PPUs 316a may be controlled based upon the loading of the VPU 308 by the scalar units 106. For example, the number of active PPUs 316 may be adjusted based upon the number of instructions waiting to be executed.

Figure 4:
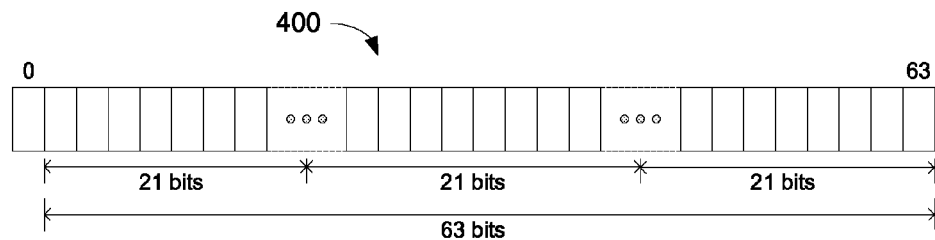
FIGS. 4-6 are graphical representations of examples of instruction packets used in the processor architectures of FIGS. 1-3 in accordance with various embodiments of the present disclosure.

To further improve performance of the processor unit 100, a common length instruction may be used for both scalar and vector video data processing. By reducing the instruction length, provides code compactness benefits as well as a reduction in power consumption by reducing fetching of instruction data from memory. In many processors, scalar operations and vector operations utilize different instruction lengths. For example, vector instructions are 80-bits and scalar instructions vary from 16-bits to 48-bits in length. Such servicing of variable length instructions requires parsing of the instructions prior to assigning processing capacity to service or execute the instructions. Referring to FIG. 4, shown is a common length instruction packet 400 may be used for both scalar and vector instructions. A consistent size packet (e.g., a 64-bit packet) may be established for both scalar and vector video processing instructions as illustrated in FIG. 4. With the scalar instructions, a 64 bit instruction packet may include, e.g., three 21-bit instructions with a one bit header. While the example is presented in terms of a 64-bit instruction packet, other size instruction packets may also be utilized as can be understood. Vector processing instruction packets may include a one bit header and a 63-bit vector instruction. By using a common length instruction configuration, the scalar instructions and vector instructions may be interleaved with one another as required for servicing or execution by the processor unit 100.

Figure 5:
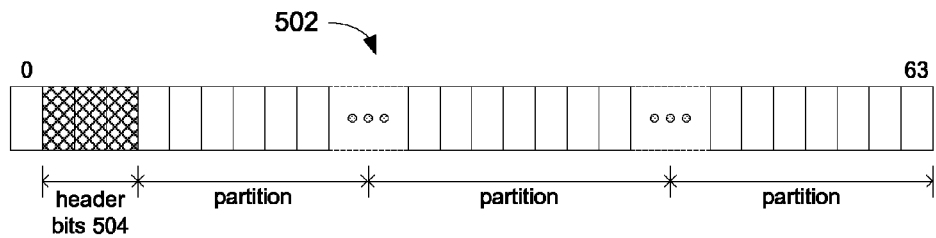

Scalar instruction packets may also include flexible partitioning of the 64-bit word. A 64-bit scalar instruction packet may be partitioned into at least eight different partitions ranging from a 64-bit vector instruction to three 19-bit instructions and combinations thereof. A header portion of a scalar instruction packet (e.g., 3 or 4 bits) may be used to indicate the current partitioning of the scalar instructions. FIG. 5 illustrates a scalar instruction packet 502 including three header bits 504 that may be used as a partition indicator. For example, the scalar instruction packet may be partitioned into a first partition with a length of 19-bits and a second partition with length of 38-bits. Other partition lengths and/or combinations of partition lengths of the scalar instruction packet are possible as can be understood. During encoding of the instructions within the different packet partitions, common fields may be positioned in the same location for partitions with different lengths. For example, if a destination register is specified within a 38-bit instruction, then that destination register would be in the correct location for one of the 19-bit instructions that correspond to the 38-bit instruction in the 64-bit instruction packet.

Figure 6:
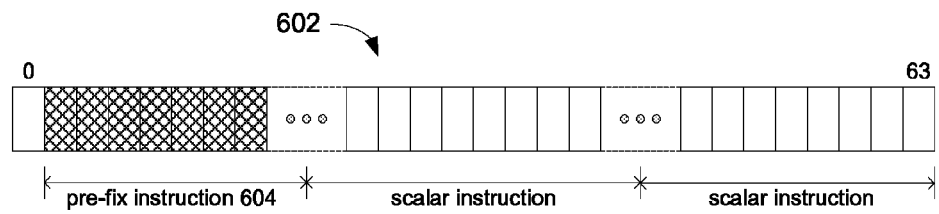
Figure 6:
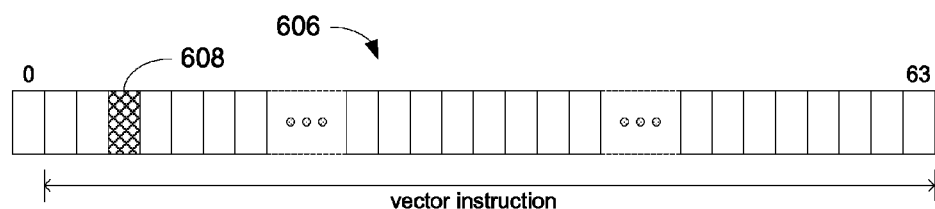

In other implementations, a vector modifier instruction may be included in a preceding scalar instruction packet and utilized for processing of subsequent vector instructions associated with the modifier. The vector processing unit may then determine if the modification should be applied to subsequent vector instructions. For instance, as illustrated in FIG. 6, a scalar instruction packet 602 may be sent with a separate "pre-fix" instruction 604 that defines a modification to be applied to subsequent vector instructions as indicated. Conventional vector instructions have many different modifiers that can be applied to the instruction. With pixel processing implementations, the same set of modifiers are often repeatedly defined for each of a number of vector instructions applied across a row. Instead of specifying such modifiers as part of each vector instruction, a separate modifier instruction may be sent as a pre-fix instruction 604 as part of a scalar instruction packet and applied to a plurality of subsequent vector instructions. The pre-fix instruction 604 may take the place of a scalar instruction in a scalar instruction packet 602. For example, it might comprise a header and footer framing of any number of middling vector instructions. In other embodiments, the modifier instruction 604 may be a leading header, trailer, interspersed, and/or may involve multiple instructions.

The scalar instruction packet 602 is followed by any number of vector instruction packet(s) 606, which may be mixed or interleaved with other scalar instruction packets. As illustrated in FIG. 6, subsequent vector instructions may include a modification indicator such as, e.g., a bit (e.g., bit 608) that indicates whether the currently-active pre-fix instruction 604 should be applied to the vector instruction. For example, the modification of the pre-fix instruction is applied if the bit is set (e.g., bit=1) and not applied otherwise (e.g., bit=0). The pre-fix instruction may be maintained and applied to any number of designated vector instructions until replaced by another pre-fix instruction. In other implementations, the modification may operate as a header with a count field identifying the number of subsequent vector instruction packets to which it applies. In other implementations, another pre-fix instruction may be sent to terminate the modifier at the end of the vector instructions.

Figure 7:
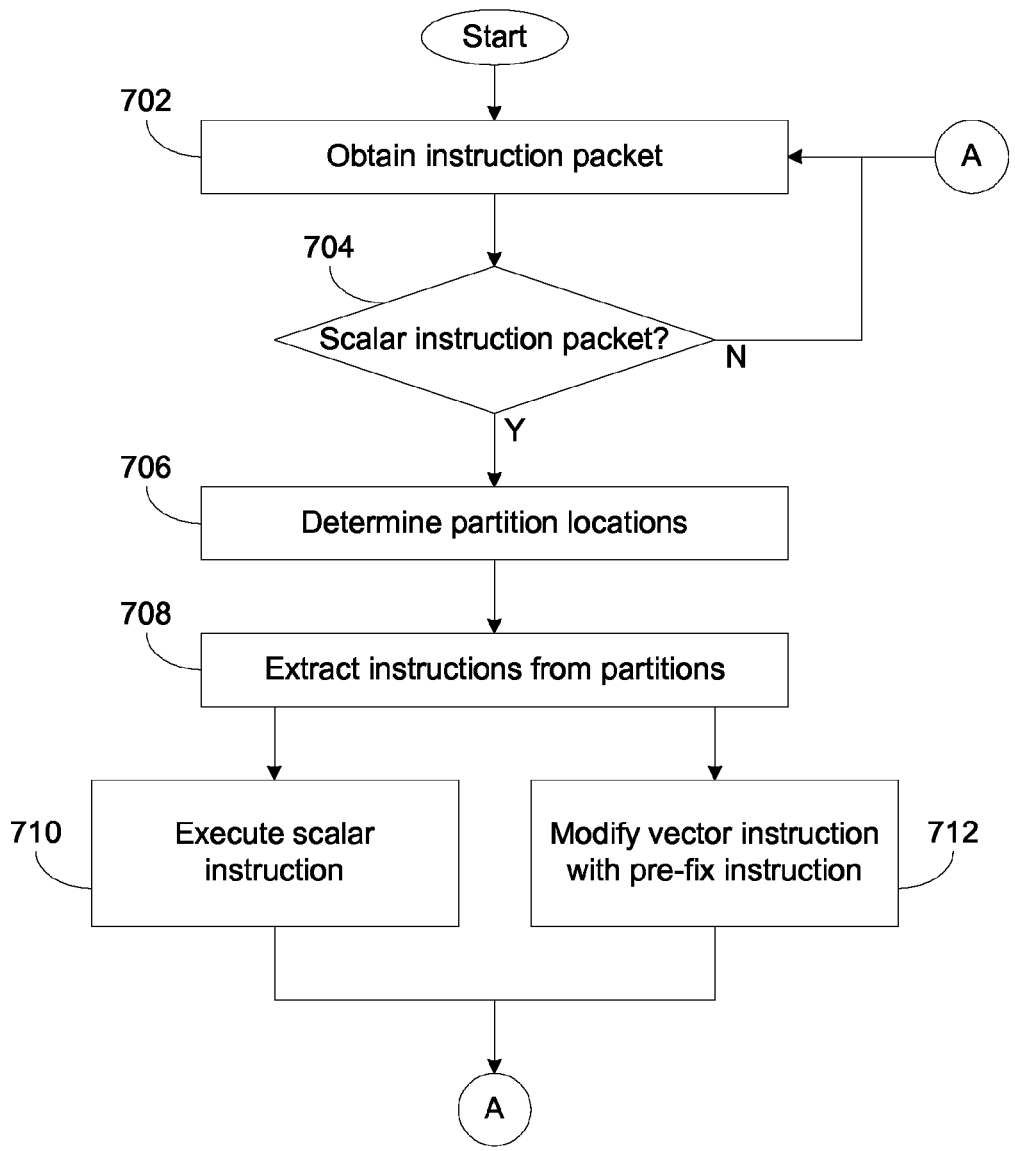
FIG. 7 is a flowchart illustrating the use of the flexible partitions within a scalar instruction packet of FIGS. 4-5 in accordance with various embodiments of the present disclosure.

Referring to FIG. 7, shown is a flowchart illustrating the use of the flexible partitions within a scalar instruction packet. When the scalar instruction packet 502 (FIG. 5) is generated, the partition indicator (e.g., header bits 504) is set to indicate the partition locations within the scalar instruction packet 502. In block 702 FIG. 7, an instruction packet is obtained. A processing unit including a scalar processing unit and a vector processing unit determines if the instruction packet is a scalar instruction packet 502 including a plurality of partitions in block 704. The scalar instruction packet 502 may include scalar instructions, pre-fix instructions, etc. within the partitions. In block 706, the location of the partitions in the scalar instruction packet is determined based upon the partition indicator included in the scalar instruction packet 502. For example, a plurality of header bits 504 may be read and used to identify the locations of the partitions. The instructions are extracted from the partitions in block 708. Scalar instructions are executed in block 710 by the scalar processing unit. If a pre-fix instruction is included in the scalar instruction packet, then the pre-fix instruction may be used to modify a subsequent vector instruction in block 712 as discussed below. The flow repeats by returning to block 702 where another instruction packet is obtained. Variations in the partition locations of different the scalar instruction packets are determined based upon the partition indicator included in the scalar instruction packet.

Figure 8:
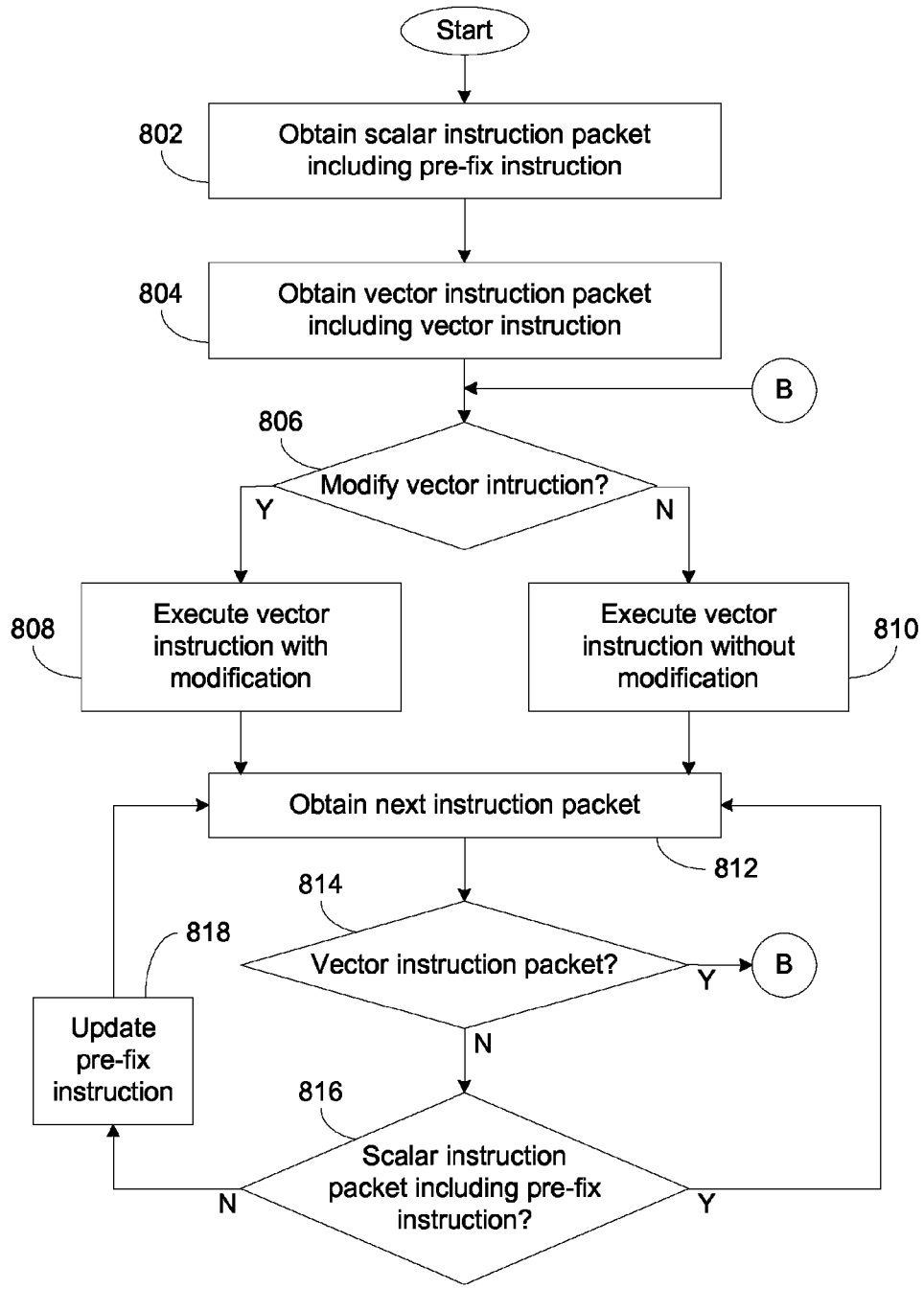
FIG. 8 is a flowchart illustrating the illustrating the use of a pre-fix instruction included in a scalar instruction packet of FIGS. 4-5 in accordance with various embodiments of the present disclosure.

Referring next to FIG. 8, shown is a flowchart illustrating the use of a pre-fix instruction with respect to vector instructions. Beginning with block 802, a scalar instruction packet including a pre-fix instruction is obtained by a processing unit. The pre-fix instruction is extracted from the scalar instruction packet and stored for use. In block 804, a vector instruction packet including a vector instruction is obtained after the scalar instruction packet and it is determined in block 806 whether the vector instruction included in the vector instruction packet should be modified. In some implementations, the vector instruction includes a modification identifier that indicates whether the pre-fix instruction should be applied. For example, a bit at a predefined location may be set (e.g., to 1) to indicate that modification using the pre-fix instruction should occur or not set (e.g., to 0) to indicate that the vector instruction should not be modified. The vector instruction is executed with modification in block 808 and without modification in block 810 based upon the modification indication. Vector instructions and pre-fix instructions are executed in a processing unit including a scalar processing unit and a vector processing unit.

The next instruction packet is obtained in block 812. If the instruction packet is a vector instruction packet, then the flow returns to block 806 where it is determined if the vector instruction should be modified as discussed. If the instruction packet is not a vector instruction packet, then it is determined in block 816 whether the scalar instruction includes a new pre-fix instruction. If so, then the stored pre-fix instruction is updated and the flow returns to block 812, where the next instruction packet is obtained. If not, then flow simply returns to block 812 to obtain the next instruction packet.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A processing unit, comprising:
   a plurality of scalar processing units; and
   a vector processing unit in communication with each of the plurality of scalar processing units, the vector processing unit configured to coordinate parallel execution of instructions received from the plurality of scalar processing units by time multiplexing, wherein a plurality of instructions received in a same clock cycle from separate scalar processing units are queued for execution based upon a predetermined ordering of the plurality of scalar processing units.

2. The processing unit of claim 1, wherein the predetermined ordering is a round robin ordering of the plurality of scalar processing units.

3. The processing unit of claim 1, wherein the plurality of instructions received in the same clock cycle are allowed to be queued for execution based upon a predetermined ranking of the plurality of scalar processing units.

4. The processing unit of claim 1, wherein the vector processing unit comprises a number of pixel processing units including eight or less active pixel processing units.

5. The processing unit of claim 4, wherein the number of pixel processing units is based upon a defined vector processing unit performance.

6. A chip, comprising:
   a plurality of scalar processing units; and
   a vector processing unit in communication with each of the plurality of scalar processing units, the vector processing unit configured to coordinate parallel execution of instructions received from the plurality of scalar processing units by time multiplexing, wherein a plurality of instructions received in a same clock cycle from separate scalar processing units are queued for execution based upon a predetermined ordering of the plurality of scalar processing units.

7. The chip of claim 6, wherein the predetermined ordering is a round robin ordering of the plurality of scalar processing units.

8. The chip of claim 6, wherein the plurality of instructions received in the same clock cycle are allowed to be queued for execution based upon a predetermined ranking of the plurality of scalar processing units.

9. The chip of claim 6, wherein the vector processing unit comprises a plurality of pixel processing units (PPUs), where a portion of the plurality of PPUs are deactivated.

10. The chip of claim 9, wherein the plurality of PPUs includes a number of active PPUs, the number of active PPUs based at least in part upon loading of the vector processing unit.

11. The chip of claim 10, wherein the number of active PPUs based upon a quantity of queued instructions waiting to be executed.

12. The chip of claim 10, wherein the active PPUs of the plurality of PPUs execute instructions in a plurality of clock cycles.

13. A method, comprising:
receiving, by a vector processing unit, instructions from a plurality of scalar processing units in a clock cycle; and
queuing, by the vector processing unit, the instructions from the plurality of scalar processing units to coordinate parallel execution of the instructions by time multiplexing, wherein a plurality of instructions received in a same clock cycle from separate scalar processing units are queued for execution based upon a predetermined ordering of the plurality of scalar processing units.

14. The method of claim 13, wherein the predetermined ordering is a round robin ordering of the plurality of scalar processing units.

15. The method of claim 13, wherein the plurality of instructions received in the same clock cycle are queued based upon a predetermined ranking of the plurality of scalar processing units.

16. The processing unit of claim 1, wherein a scalability of the vector processing unit is allowed to be moved downward to enable smaller blocks than a vector length are operated upon, and wherein the vector length is associated with a platform or a die space.

17. The processing unit of claim 1, wherein tags are allowed to be passed to the vector processing unit to indicate the scalar processing unit that corresponds to the instruction performed by the vector processing unit.

18. The method of claim 13, further comprising allowing a scalability of the vector processing unit to be moved downward to enable operation upon smaller blocks than a vector length, and wherein the vector length is associated with a platform or a die space.

19. The method of claim 13, wherein tags are allowed to be passed to the vector processing unit to indicate the scalar processing unit that corresponds to the instruction performed by the vector processing unit.

20. The chip of claim 6, wherein tags are allowed to be passed to the vector processing unit to indicate the scalar processing unit that corresponds to the instruction performed by the vector processing unit.

21. The chip of claim 6, wherein a scalability of the vector processing unit is allowed to be moved downward to enable smaller blocks than a vector length are operated upon,
and wherein the vector length is associated with a platform or a die space.

* * * * *